United States Patent
Ganglin et al.

(10) Patent No.: US 10,986,959 B2
(45) Date of Patent: Apr. 27, 2021

(54) HOT-AIR COOKER

(71) Applicant: SEB S.A., Ecully (FR)

(72) Inventors: Chen Ganglin, Zhejiang (CN); Lu Yongzhu, Zhejiang (CN); Lin Cheng, Zhejiang (CN)

(73) Assignee: SEB S.A.

(*) Notice: Subject to any disclaimer, the term of this patent is extended or adjusted under 35 U.S.C. 154(b) by 208 days.

(21) Appl. No.: 16/089,906

(22) PCT Filed: Mar. 30, 2017

(86) PCT No.: PCT/FR2017/050734
§ 371 (c)(1),
(2) Date: Sep. 28, 2018

(87) PCT Pub. No.: WO2017/191377
PCT Pub. Date: Nov. 9, 2017

(65) Prior Publication Data
US 2020/0214499 A1 Jul. 9, 2020

(30) Foreign Application Priority Data

Mar. 31, 2016 (CN) .......................... 201620270787.8

(51) Int. Cl.
| | | |
|---|---|---|
| *A47J 37/06* | (2006.01) | |
| *A47J 36/06* | (2006.01) | |
| *A47J 36/16* | (2006.01) | |
| *A47J 37/04* | (2006.01) | |

(52) U.S. Cl.
CPC ....... *A47J 37/0641* (2013.01); *A47J 37/0664* (2013.01); *A23V 2002/00* (2013.01); *A47J 36/06* (2013.01); *A47J 36/165* (2013.01); *A47J 37/047* (2013.01)

(58) Field of Classification Search
CPC .... A47J 37/0641; A47J 37/0664; A47J 36/06; A47J 36/165; A47J 37/047; A47J 37/0722; A47J 43/0711; A47J 43/0722
See application file for complete search history.

(56) References Cited

U.S. PATENT DOCUMENTS

| | | | | |
|---|---|---|---|---|
| 2005/0223906 A1* | 10/2005 | Xu | ...................... | A47J 37/0641 99/348 |
| 2008/0163764 A1* | 7/2008 | Payen | ................. | A47J 37/0641 99/447 |

FOREIGN PATENT DOCUMENTS

FR          2 995 775 A1    3/2014

OTHER PUBLICATIONS

International Search Report as issued in International Patent Application No. PCT/FR2017/050734, dated Jul. 7, 2017.

* cited by examiner

*Primary Examiner* — Brian W Jennison
(74) *Attorney, Agent, or Firm* — Lerner, David, Littenberg, Krumholz & Mentlik, LLP

(57) ABSTRACT

A hot-air cooker includes a housing including an internal ventilation conduit provided with an inlet and an outlet; an outer container, installed inside the housing; an upper cover, installed above the outer container; the outer container and the upper cover constituting a cavity, the air inlet and outlet of the ventilation conduit communicating with the cavity; an inner container, located inside the cavity; a fan, installed inside the ventilation conduit; a resistor, installed inside the ventilation conduit and adjacent to the fan.

9 Claims, 1 Drawing Sheet

HOT-AIR COOKER

CROSS-REFERENCE TO RELATED APPLICATIONS

This application is the U.S. National Stage of PCT/FR2017/050734 filed Mar. 30, 2017, which in turn claims priority to Chinese patent application number 201620270787.8 filed Mar. 31, 2016. The content of these applications are incorporated herein by reference in their entireties.

This invention concerns the field of electrical cooking appliances, more specifically a cooker.

The cookers currently on the market, such as hot-air fryers, for example, always heat foods either from top to bottom, or from bottom to top, but without convection movement of hot air.

Consequently, the cooking of the foods is slower and not uniform.

This invention consists of a cooker aimed at solving the problem of the lack of convection movement of the air during cooking.

To achieve this objective, this invention proposes a hot-air cooker comprising:
  A housing comprising an internal ventilation conduit provided with an air inlet and air outlet;
  An outer container, installed inside the housing;
  An upper cover, installed above the outer container the outer container and the upper cover constituting a cavity, the air inlet and outlet of the ventilation conduit communicating with the cavity;
  An inner container, located inside the cavity;
  A fan, installed inside the ventilation conduit;
  A resistor, installed inside the ventilation conduit and adjacent to the fan.

According to another embodiment variant, the air outlet of the ventilation conduit is located above its air inlet, and the rim of the inner container is located below the air outlet of the ventilation conduit.

According to another embodiment variant, the rim of the inner container is located above the air inlet of the ventilation conduit.

According to another embodiment variant, the resistor is adjacent to the fan and is located above the latter.

According to another embodiment variant, the ventilation conduit comprises an air inlet and an air outlet of the same height and also of the same width.

According to another embodiment variant, the ventilation conduit comprises an air inlet and an air outlet of different heights and also of different widths.

According to another embodiment variant, the fan is an axial fan or radial fan.

According to another embodiment variant, the hot-air cooker comprises an inner container in the bottom of which is installed a rotary mixer, the cooker comprising a motor installed at the bottom of the outer container, and whose output shaft drives the mixer.

According to another embodiment variant, the cooker comprises a heating plate located inside the cavity and crossed by the output shaft of the motor, the inner container being placed on the heating plate, and the foods being able to be heated by the heating plate and the resistor, at the same time or independently.

The attached drawings, which constitute an integral part of this invention, are intended to improve understanding of the invention. The schematic application examples of this invention and their explanations are intended to explain this invention without restricting it inappropriately. In the attached drawings.

It should be explained that unless there is incompatibility, the application examples of this invention and the characteristics of these application examples may be combined with one another. We will look at this invention below in detail by means of the attached references drawings combined with application examples.

Figure 1:
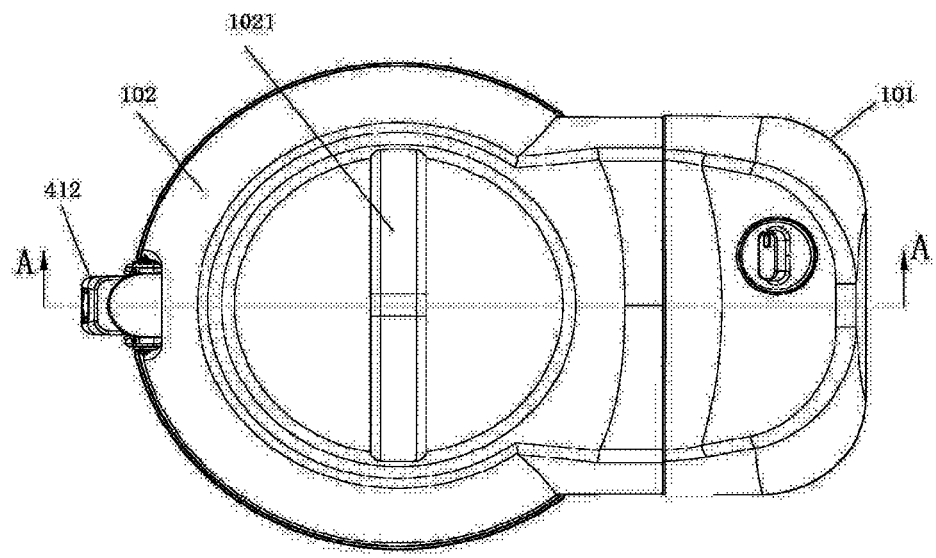
FIG. 1 is the structural diagram of a cooker according to an application example of this invention, seen from above.
Figure 2:
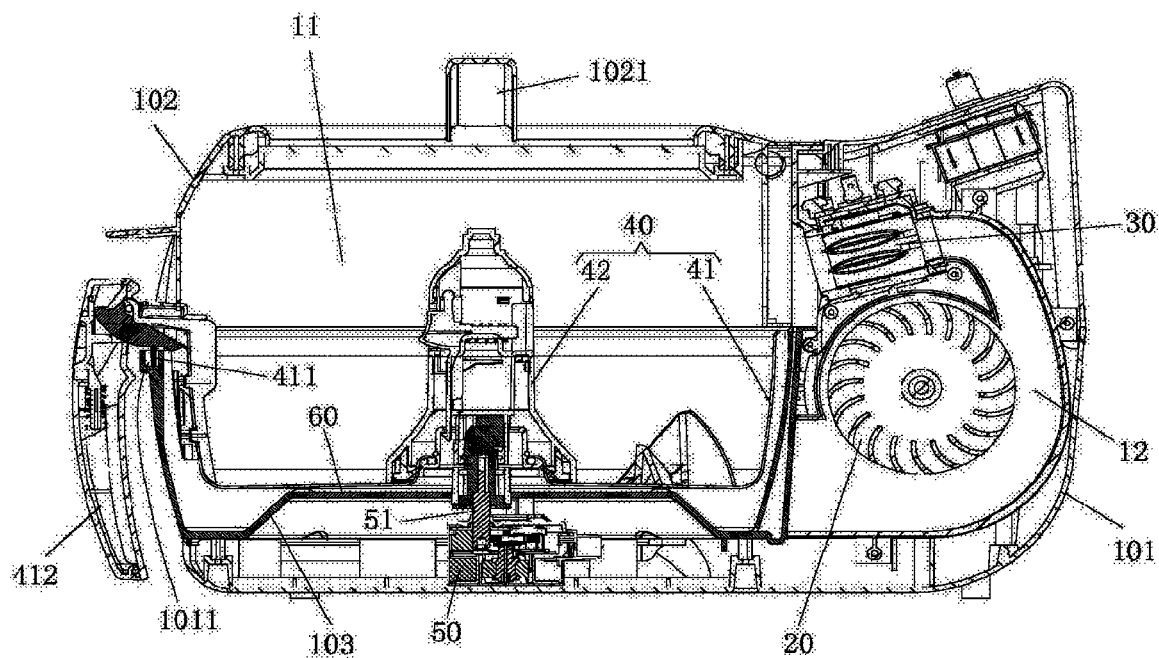
FIG. 2 is an A-A cross section of FIG. 1.

The application example of this invention is a hot-air cooker with a housing 101, an inner container 41, a fan 20 and a resistor 30 (see FIGS. 1 and 2). The housing 101 comprises an outer container 103 and an upper cover 102 connected to one another. The housing 101 contains a cavity 11 in which is found the inner container 41, itself placed on the outer container 103. The upper cover 102 allows the inner container 41 to be opened and closed.

A ventilation conduit 12 is located against the inner side of the housing 101. The air inlet and outlet of the ventilation conduit 12 communicate with the cavity 11. The fan 20 is installed in the ventilation conduit 12. The resistor 30 is also installed in the ventilation conduit 12, above the fan 20. When the fan 20 is operating, it blows the air heated by the resistor 30 into the cavity 11 where the foods are found.

In the proposed solution, the hot-air cooker has a housing 101 having an approximately circular shape (see FIG. 1). An inner container 41 is located inside the outer container 103; an upper cover 102 is placed above the outer container 103 and is used to close the inner container during cooking, before being opened to retrieve the foods once the cooking is finished. In addition, on the upper cover 102 is found a handle 1021 making the cover easier for the user to manipulate.

The fan 20 of the ventilation conduit 12 of the cooker puts the air in motion. The air is heated by the resistor 30 and passes from the air outlet of the ventilation conduit to the cavity 11, where it heats the foods in the inner container 41. As the air inlet of the ventilation conduit 12 communicates with the cavity 11, the ventilation conduit 12 and the cavity 11 constitute a closed convection circuit. The air heated by the resistor 30, after having heated the foods, passes into the air inlet of the ventilation conduit, while keeping a certain quantity of residual heat; this air that is still warm is heated again by the resistor 30 and then passes back into the cavity 11 where it further heats the foods in the inner container 41. In conclusion, this invention operates according to the principle of a hot air convection circuit which increases the cooking efficiency.

It should be specified that in this example, the air outlet and the air inlet of the ventilation conduit 12 may or may not be of the same size. For example, the height and width of the air outlet and the air inlet may be identical or different. This parameter may be adapted according to the targeted application.

In this example, the air outlet of the ventilation conduit 12 is located above the air inlet (see FIG. 2), the rim of the inner container 41 is located below the air outlet of the ventilation conduit 12 and above the air inlet of the ventilation conduit. Since the wall of the inner container 41 is to a certain extent an obstacle to air circulation between the air inlet and outlet, the hot air remains in the inner container 41 for a bit longer, thereby improving the cooking efficiency, and then, as a result of the suction force of the fan 20, the hot air passes back into the air inlet, and the cycle begins again.

According to another embodiment example (not illustrated), the air inlet and outlet are both located above the rim of the inner container 41; in addition, the air inlet and outlet of the ventilation conduit 12 are at the same height, and the rim of the inner container 41 is located below the air outlet of the ventilation conduit 12. In this way, the air circulates more rapidly.

In the embodiment example in FIG. 2, a rotary mixer 42 is mounted in the bottom of the inner container 41. The mixer 42 and the inner container 41 constitute together the inner container 40. The cooker also comprises a motor 50 installed at the bottom of the housing, and whose output shaft 51 drives the mixer 42. During cooking, the mixer 42 driven by the motor 50 mixes the foods and brings them into contact with the high-temperature wall of the inner container 41. The cooking is thus both more uniform and more flavorful.

Because of the rotary movement of the mixer 42 during cooking, the inner container 41 naturally tends to follow the movement and to turn at the same time. To correct this problem, the housing 101 comprises a positioning groove 1011 in which is inserted a positioning protrusion 411 located on the outer wall of the inner container 41 when the latter is mounted in the cavity 11; the inner container 41 is immobilized in this way. This positioning protrusion 411 and groove 1011 device allows the user to install the inner container 41 into the cavity 11 more rapidly and more precisely.

In the application, since the inner container 41 is brought to a very high temperature during cooking, in order to avoid any burn risk for the user, the inner container 41 comprises a handle 412 installed on its outer wall. Consequently, the wall of the housing 101 comprises a recess intended to accommodate the handle 412 of the inner container 41 when the latter is mounted in the cavity 11. The positioning protrusion 411 is located between the wall of the inner container 41 and the handle 412 of the latter. In this way, this protrusion 411 is not visible on the rim of the inner container 41. A visible protrusion at this location would negatively affect the aesthetics of the container.

In this application, in order to improve the cooking performance of the cooker, the latter also comprises a heating plate 60 located inside the cavity 11 and crossed by the output shaft 51 of the motor 50. During cooking, the inner container 41 is placed on the heating plate 60, and the foods can be heated by the heating plate 60 and the resistor 30 either at the same time, or independently.

Advantageously, the fan 20 is an axial fan or radial fan.

As FIGS. 1 and 2 indicate, the cooker comprises an upper cover 102 which is closed on the housing 101 through a rotation motion. The rotatable mounting of the upper cover 102 on the housing 101 allows the user to open the cooker more easily.

This invention is in no way limited to the examples described, but encompasses many modifications in the context of the claims.

The invention claimed is:

1. A hot-air cooker comprising:
   a housing comprising an internal ventilation conduit provided with an air inlet and air outlet;
   an outer container, installed inside the housing;
   an upper cover, installed above the outer container; the outer container and the upper cover constituting a cavity, the air inlet and outlet of the internal ventilation conduit communicating with the cavity;
   an inner container, located inside the cavity;
   a fan, installed inside the ventilation conduit;
   a resistor, installed inside the internal ventilation conduit and adjacent to the fan;
   a rotary mixer installed in a bottom of the inner container;
   a motor installed at the bottom of the outer container, and whose output shaft drives the rotary mixer, and
   a heating plate located inside the cavity and crossed by the output shaft of the motor, the inner container placed on the heating plate, wherein the hot-air cooker is configured to heat foods by the heating plate and the resistor, at the same time and independently.

2. The hot-air cooker according to claim 1, wherein the air outlet of the ventilation conduit is located above its air inlet, and a rim of the inner container is located below the air outlet of the internal ventilation conduit.

3. The hot-air cooker according to claim 1, wherein a rim of the inner container is located above the air inlet of the internal ventilation conduit.

4. The hot-air cooker according to claim 1, wherein the resistor is adjacent to the fan and is located above the fan.

5. The hot-air cooker according to claim 1, wherein the air inlet and air outlet of the internal ventilation conduit are of the same height and also of the same width.

6. The hot-air cooker according to claim 1, wherein the air inlet and air outlet of the internal ventilation conduit are of different heights and also of different widths.

7. The hot-air cooker according to claim 1, wherein the fan is an axial fan or radial fan.

8. A hot-air cooker comprising:
   a housing comprising an internal ventilation conduit provided with an air inlet and air outlet, the housing including an outer wall;
   an outer container, installed inside the housing;
   an upper cover, installed above the outer container; the outer container and the upper cover constituting a cavity, the air inlet and outlet of the internal ventilation conduit communicating with the cavity;
   an inner container, located inside the cavity;
   a fan, installed inside the ventilation conduit, a portion of the internal ventilation conduit abuts against the outer wall adjacent the fan;
   a resistor, installed inside the internal ventilation conduit and adjacent to the fan;
   a rotary mixer installed in a bottom of the inner container;
   a motor installed at the bottom of the outer container, and whose output shaft drives the rotary mixer, and
   a heating plate located inside the cavity and crossed by the output shaft of the motor, the inner container placed on the heating plate, and wherein the hot-air cooker is configured to heat foods by the heating plate and the resistor, at the same time or independently.

9. A hot-air cooker comprising:
   a housing comprising an internal ventilation conduit provided with an air inlet and air outlet;
   an outer container, installed inside the housing;
   an upper cover, installed above the outer container; the outer container and the upper cover constituting a cavity, the air inlet and outlet of the internal ventilation conduit communicating with the cavity;
   an inner container, located inside the cavity;
   a fan, installed inside the ventilation conduit, the fan having an axis of rotation that is parallel or tangential to the inner container;
   a resistor, installed inside the internal ventilation conduit and adjacent to the fan;
   a rotary mixer installed in a bottom of the inner container;
   a motor installed at the bottom of the outer container, and whose output shaft drives the rotary mixer, and a heating plate located inside the cavity and crossed by the output shaft of the motor, the inner container placed on the heating plate, and wherein the hot-air cooker is configured to heat foods by the heating plate and the resistor, at the same time or independently.

\* \* \* \* \*